(12) United States Patent
Wang et al.

(10) Patent No.: US 12,141,372 B2
(45) Date of Patent: Nov. 12, 2024

(54) COLLABORATION MODE FOR TOUCHPADS

(71) Applicant: Dell Products, L.P., Round Rock, TX (US)

(72) Inventors: Kai Wang, Shanghai (CN); Daniel L. Hamlin, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/652,155

(22) Filed: Feb. 23, 2022

(65) Prior Publication Data
US 2023/0266833 A1  Aug. 24, 2023

(51) Int. Cl.
*G06F 3/0354* (2013.01)
*G06F 3/0488* (2022.01)

(52) U.S. Cl.
CPC ........ *G06F 3/03545* (2013.01); *G06F 3/0488* (2013.01); *G06F 2203/04108* (2013.01); *G06F 2203/04114* (2019.05); *G06F 2203/04806* (2013.01)

(58) Field of Classification Search
CPC ..... G06F 3/03545; G06F 3/048–04892; G06F 2203/04108; G06F 2203/04114; G06F 2203/04806; G06F 3/0441; G06F 3/0442; G06F 3/0488; G06F 3/03547; G06F 3/038; G06F 3/04845; G06F 3/04883
See application file for complete search history.

(56) References Cited

U.S. PATENT DOCUMENTS

| | | | |
|---|---|---|---|
| 6,380,929 B1* | 4/2002 | Platt | G06F 3/0488 345/173 |
| 2007/0063987 A1* | 3/2007 | Sato | G06F 3/03547 345/173 |
| 2016/0062452 A1* | 3/2016 | Kim | G06F 3/04883 345/661 |
| 2019/0034070 A1* | 1/2019 | Singh | G06F 3/04842 |
| 2019/0113986 A1* | 4/2019 | Bikumala | G06F 3/017 |
| 2019/0235648 A1* | 8/2019 | Ligameri | G06F 3/04842 |
| 2020/0192497 A1* | 6/2020 | Knoppert | G06F 3/0412 |
| 2022/0236847 A1* | 7/2022 | Bowden | G06F 3/0488 |

* cited by examiner

*Primary Examiner* — Nitin Patel
*Assistant Examiner* — Ivelisse Martinez Quiles
(74) *Attorney, Agent, or Firm* — Forgarty LLP

(57) ABSTRACT

Embodiments of systems and methods for providing a collaboration mode for touchpads are described. In an illustrative, non-limiting embodiment, an Information Handling System (IHS) may include a processor and a memory coupled to the processor, the memory having program instructions stored thereon that, upon execution by the processor, cause the IHS to receive inputs from a posture sensor, a software monitor, and a pen sensor, and set a touchpad to collaboration mode in response to the inputs.

20 Claims, 3 Drawing Sheets

COLLABORATION MODE FOR TOUCHPADS

FIELD

This disclosure relates generally to Information Handling Systems (IHSs), and more specifically, to systems and methods for providing a collaboration mode for touchpads.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for providing a collaboration mode for touchpads are described. In an illustrative, non-limiting embodiment, an Information Handling System (IHS) may include: a processor and a memory coupled to the processor, the memory having program instructions stored thereon that, upon execution by the processor, cause the IHS to receive inputs from a posture sensor, a software monitor, and a pen sensor, and set a touchpad to collaboration mode in response to the inputs.

For example, an input from the posture sensor may include an indication that the IHS is in a laptop posture. An input from the software monitor may include an indication of a collaboration application. An input from the software monitor may include at least one of: a time of a collaboration session, a location of a participant of the collaboration session, or a role of a participant of the collaboration session. An input from the pen sensor may include an indication that an active pen is present. An input from the pen sensor may include an indication of a distance or proximity of the active pen to the IHS or touchpad.

In the collaboration mode, the program instructions, upon execution, may cause the IHS to: determine a relative position of an active pen on the touchpad, render a pointer at a display position corresponding to the relative position, and, in response to a command, determine an absolute position of the active pen on the touchpad and enable one or more drawing tools using the absolute position. For example, the command may include a keyboard keystroke, and the command may include a pen button toggle. The one or more drawing tools may be part of a collaboration application monitored by the software monitor.

Additionally, or alternatively, in the collaboration mode, the program instructions, upon execution, may cause the IHS to, in response to the command, change a palm rejection setting of the touchpad.

Additionally, or alternatively, the program instructions, upon execution, may cause the IHS to determine that the active pen is hovering above another absolute position of the touchpad, and initiate a zoom window at a display location corresponding to the other absolute position. The program instructions, upon execution, may also cause the IHS to detect a vertical distance between the active pen and the touchpad, and increase or reduce an amount of magnification of the zoom window proportionally to the vertical distance.

The program instructions, upon execution, may also cause the IHS to set the touchpad to mouse mode in response to a changed input from at least one of: the posture sensor, the software monitor, or the pen sensor.

In another illustrative, non-limiting embodiment, a method may include operating a pointer on a display position corresponding to a relative position of a pen on a touchpad and, in response to a command, operating a drawing tool on another display position corresponding to an absolute position of the pen on the touchpad. The method may also include determining that the pen is hovering above the absolute position and rendering a zoom window at a display location corresponding to the absolute position. The method may further include detecting a vertical distance between the pen and the touchpad and changing an amount of magnification in the zoom window proportionally to the vertical distance.

In another illustrative, non-limiting embodiment, a hardware memory device may have program instructions stored thereon that, upon execution by a processor of an IHS, cause the IHS to: operate a pointer on a display position corresponding to a relative position of a pen on a touchpad and, in response to a command, operate a drawing tool on another display position corresponding to an absolute position of the pen on the touchpad. The program instructions, upon execution, may also cause the IHS to determine that the pen hovers above another absolute position and render a zoom window at a display location corresponding to the other absolute position. The program instructions, upon execution, may further cause the IHS to detect a vertical distance between the pen and the touchpad and change an amount of magnification in the zoom window proportionally to the vertical distance.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
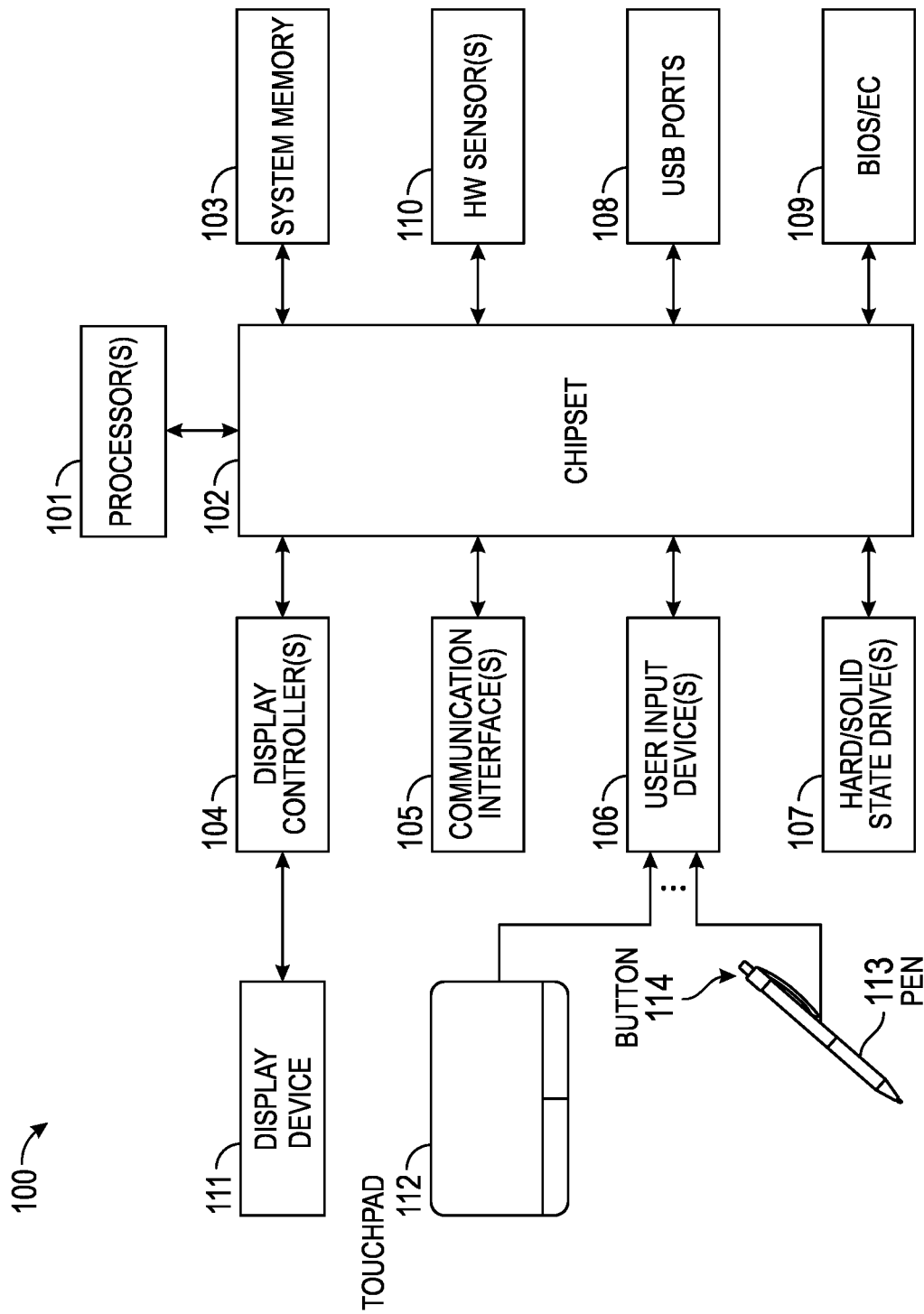
FIG. 1 is a block diagram of components of an example Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. It should be appreciated that although certain embodiments are discussed in the context of a personal computing device, other embodiments may utilize various other types of IHSs.

IHSs with a clamshell form factor, such as laptops, usually do not offer touchscreen capabilities. When a typical laptop user enters a remote collaboration environment, such as an online whiteboarding session or the like, it can be difficult for them to annotate, write, or draw smoothly with a mouse or conventional touchpad. When the user wishes to create a drawing, for example, they may have to open a separate application and/or employ a different peripheral device (e.g., a dedicated drawing tablet). Even if the laptop includes a touchscreen, the user must still change the IHS's posture to be able to use it effectively, which can negatively impact the user's productivity and/or their ability to see different content or perform certain operations (e.g., keyboard keypresses, capture video with an integrated camera, etc.).

As such, remote collaboration participants often find themselves at a competitive disadvantage with respect to onsite participants, who may be able to use more suitable input devices for engaging with others during collaboration sessions. To address these, and other concerns, systems and methods described herein may provide a collaboration mode for touchpads.

In various embodiments, systems and methods described herein may collect user, IHS, and/or application context information and may dynamically modify an IHS's input controls to allow a user to interact with a touchpad in collaboration mode. For example, these systems and methods may: detect when a user enters a collaboration environment (or operates an ink-supported application), configure hardware characteristics of the touchpad's input path (e.g., sensitivity, relative position, absolute position, palm rejection, etc.) based upon the user's intent and/or changing context, and provide the received inputs to a collaboration application.

A software service may detect a change in collaboration activity and presence of an advanced input device (e.g., pen, etc.) using a sensor, and in response it may modify a touchpad's configuration to allow for digitized input. In some cases, an IHS's chassis may include a well or compartment for docking, cradling, charging, or storing a pen, and the well or dock may include such sensors. In other cases, the pen itself may include BLUETOOTH (BT) or other wireless capabilities that indicate its presence to the IHS.

The service may initiate state modification to toggle a touchpad between modes (e.g., capacitive input versus digitizer input). The service may also modify a touch input configuration within an OS to enable pen input or point-click touch input upon detection of a pen environment. Moreover, based upon a hovering distance between a pen and a touchpad's digitizer, a zoom in view of the screen may be shown and moved around (e.g., until the user places the pen on the touchpad corresponding to an area of the display where user wants to write).

The terms "touchpad," "trackpad," and "clickpad," as used herein, generally refer to a pointing device featuring a touch sensor having a specialized surface that translates motion and position detected thereon into a relative or absolute position usable by an Operating System (OS) of an IHS to render an image (e.g., an arrow, a cursor, etc.) on a display.

In various implementations, a touchpad may be a capacitive touchpad. A capacitive touchpad produces an electrostatic field that is disrupted when touched (e.g., by an object that draws some electrical charge). Particularly, a capacitive touchpad detects a reduction of its capacitance and uses that to determine when, where, and/or by how much (e.g., pressure) it is being touched. In some cases, a touchpad may also be capable of identifying hovering of an object (e.g., a finger or pen) above its surface, as well as a height of the hovering (e.g., a vertical distance between an object and the touchpad. Additionally, or alternately, a touchpad may include a digitizer under its (non-display or opaque) surface.

The terms "pen" or "stylus," as used herein, generally refer to a cylindrical object, conventionally used with touchscreen-enabled devices (e.g., tablet IHSs, to navigate a Graphical User Interface or "GUI," send messages, etc.), but which in various embodiments described herein may be further usable in conjunction with a touchpad as pointing device for handwriting and/or for drawing, for example, during a collaboration session using one or more writing or drawing tools (e.g., lines, brushes, sprays, patterns, colors, shapes, etc.).

A passive or capacitive pen is a pen that behaves like a human finger when touching a touchpad. In contrast, an active pen includes electronic components that communicate with the touchpad. Active pens may be used for, example, for note taking, on-screen drawing/painting, electronic document annotation, signatures, etc. In some cases, when either type of pen is used, the touchpad may enable or change its palm rejection settings or parameters to accommodate a user's hand holding the pen while responding only to pen inputs.

In various implementations, palm rejection may include a "large object" detection algorithm designed to reject touch events that encompass an area of greater than a selected size, such as 25 mm. Palm rejection may also include a latency or response time before which initial small areas of touch that precede a larger touch area may be detected as an having been intended by the user. In some cases, the threshold size of the rejection area and/or the latency of the palm rejection action may be used as palm rejection configuration settings or parameter(s). For example, the threshold size may be reduced to increase the aggressiveness of the palm rejection or increased to reduce the aggressiveness. Similarly, the latency may also be reduced to increase the aggressiveness of the palm rejection or increased to reduce the aggressiveness.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BLUETOOTH, cellular or mobile networks (e.g., CDMA, TDMA, LTE, etc.), satellite networks, or the like. In some cases, communication interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more Universal Serial Bus (USB) ports 108.

Chipset 102 may further provide access to one or more user input devices 106, for example, using a super I/O controller or the like. Examples of user input devices 106 include, but are not limited to, a keyboard, mouse, touchpad 112, stylus or active pen 113 (with button or switch 114), totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. The BIOS provides an abstraction layer that allows the OS to interface with certain hardware components that are utilized by IHS 100. Via the hardware abstraction layer provided by the BIOS, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may be used to validate the integrity of hardware and software components installed on IHS 100.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip. As such, in certain embodiments, IHS 100 may be implemented as different classes of computing devices including, but not limited to: servers, workstations, desktops, laptops, appliances, video game consoles, tablets, smartphones, etc.

Figure 2:
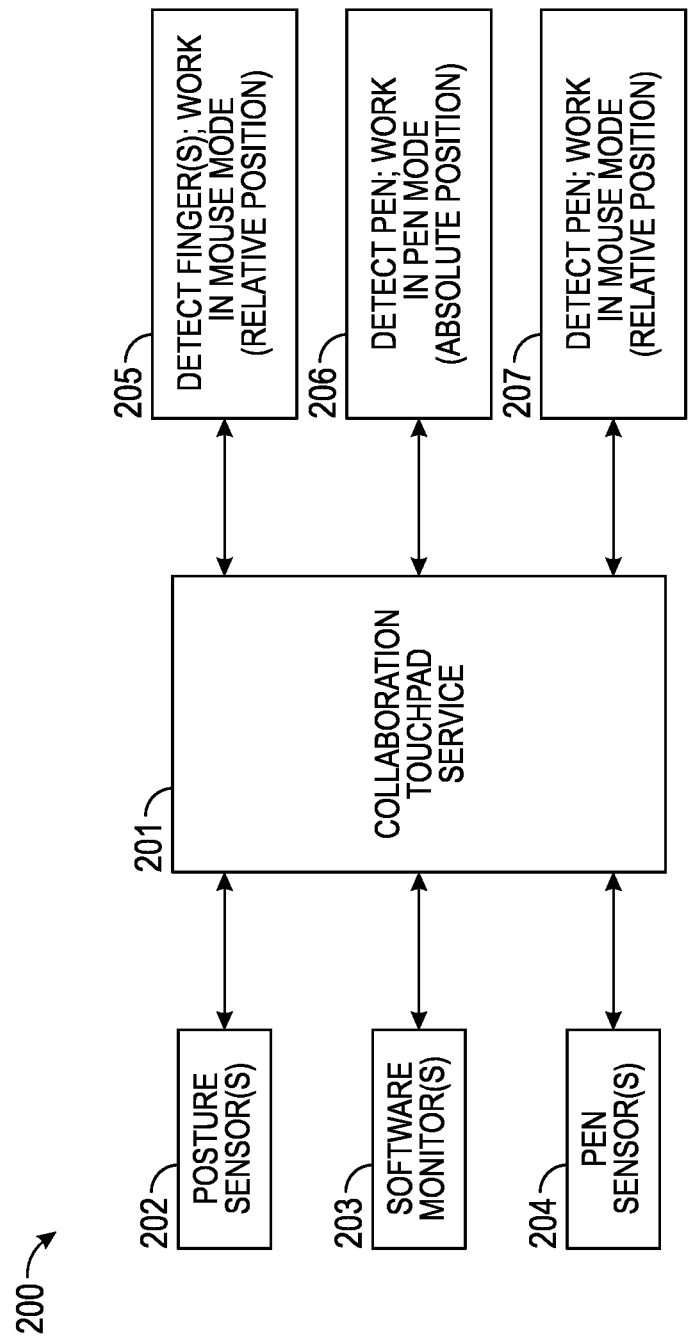
FIG. 2 is a block diagram of an example of a system for providing a collaboration mode for touchpads, according to some embodiments.

FIG. 2 is a block diagram of an example of system 200 for providing a collaboration mode for touchpads. In various embodiments, one or more elements of system 200 may be implemented by one or more components of IHS 100 and/or may be instantiated through the execution of program instructions by processor 101. As shown, collaboration touchpad service 201 may be an OS service executed by IHS 100. Collaboration touchpad service 201 may be coupled to, or in communication with, posture sensor(s) 202, software monitor(s) 203, and pen sensor(s) 204.

Posture sensor(s) 202 may include a hinge, angle, or lid sensor 110, controller(s), and/or driver(s) associated therewith. Additionally, or alternatively, posture sensor(s) 202 may include EC 109 and/or its firmware.

Software monitor(s) 203 may include an agent configured to implement an Application Programming Interface (API) for requesting and receiving contextual data from software applications executed by processor 101 (e.g., remote collaboration applications that include whiteboarding and document sharing features, ink-supported applications that enable pen-based interface at the OS level, calendar/email/messaging applications, etc.).

Pen sensor(s) 204 may include presence sensors, proximity sensors, or antennas configured to detect the presence, docking state, and/or proximity of active pen 113. Additionally, or alternatively, pen sensor(s) 204 may include a pen controller, firmware, and/or driver (a Human Interface Device driver or "HID"). Additionally, or alternatively, pen sensor(s) 204 may include an electromechanical sensor coupled to shortcut button or switch 114 disposed on active pen 113.

In operation, collaboration touchpad service 201 may receive inputs from each of elements 202-204 to set a selected operating mode for touchpad 112, for instance, by selecting one or more of the touchpad's settings. Examples of touchpad settings include, for example: turning capacitive sensing on/off, turning a digitizer on/off, setting a sensitivity or palm rejection feature (e.g., aggressiveness, etc.), configuring shortcut button 114 (e.g., associating it with an application or command), etc.

Particularly, in mode 205, touchpad 112 may have settings configured to detect one or more human fingers (or passive pens) and to operate in mouse mode based upon the relative position and movement of the fingers on the touchpad's capacitive sensor. In mode 206, touchpad 112 may have its settings configured to detect active pen 113 and to work based upon an absolute pen position (e.g., using a digitizer) on its surface, which may be used, for example, as a drawing board. While in mode 206, hovering of active pen 113 above touchpad 112 may enable zooming in and out and/or panning a zoom window around a corresponding area of display device 111. In mode 207, touchpad 112 may have its settings configured to detect active pen 113 and to work in mouse mode based on the relative position of active pen 113 on touchpad 112.

In some embodiments, a first type of collaboration mode of touchpad 112 may include at least one of modes 206 or 207, as selected by collaboration touchpad service 201, based upon inputs received from sensor(s) and/or monitor(s) 202-204. In other embodiments, a second type of collaboration mode may include all three modes 205-207, as selected by collaboration touchpad service 201, based upon inputs received from sensor(s) and/or monitor(s) 202-204.

Figure 3:
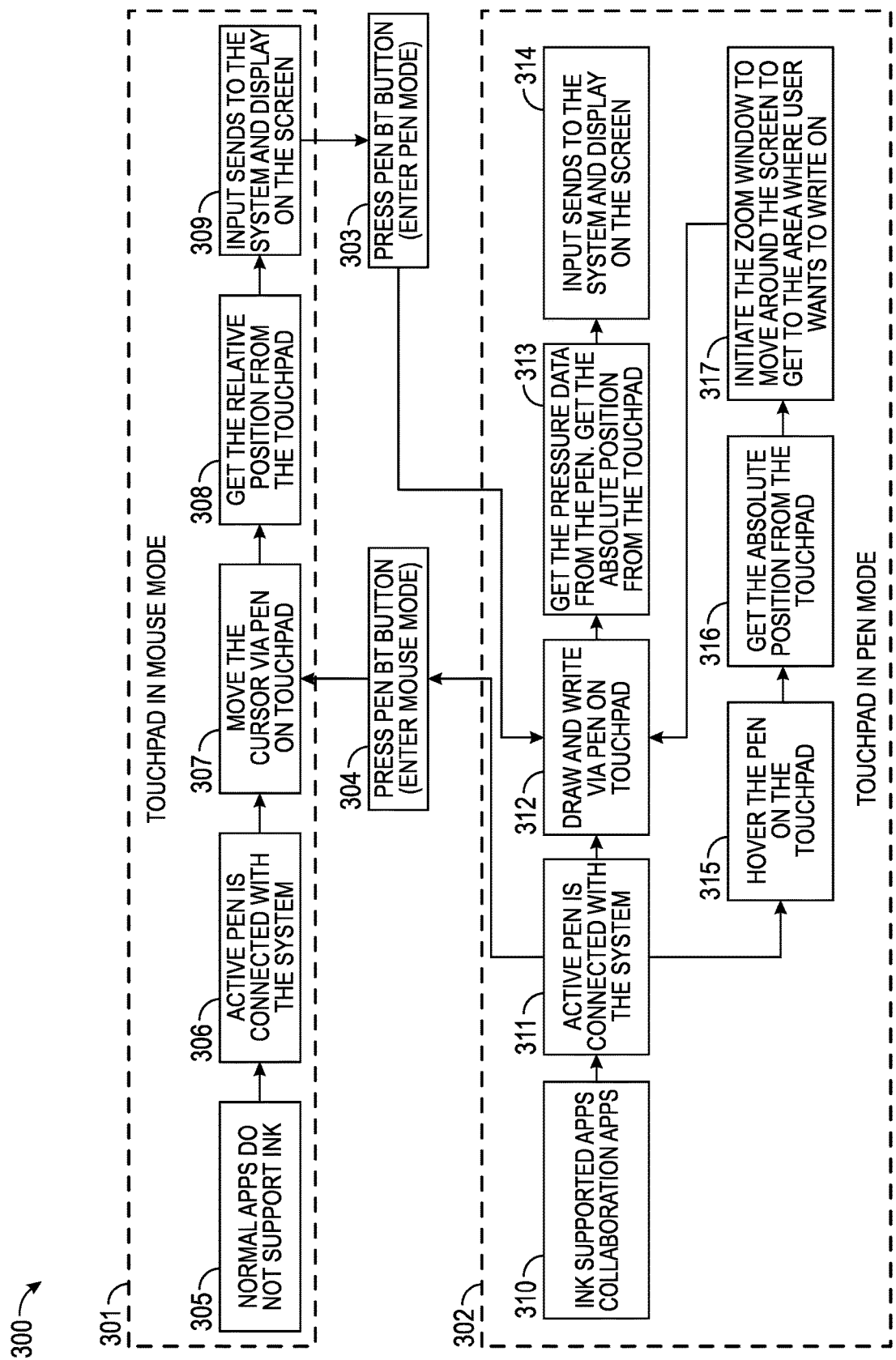
FIG. 3 is a block diagram of an example of a method for providing a collaboration mode for touchpads, according to some embodiments.

FIG. 3 is a block diagram of an example of method 300 for providing a collaboration mode for touchpads. In some embodiments, method 300 may be performed, at least in part, by collaboration touchpad service 201 of FIG. 2. The collaboration mode of method 300 may be activated, for example, in response to: posture sensor(s) 202 indicating that IHS 100 is in a laptop posture (e.g., as opposed to book posture or a closed lid); pen sensor(s) 204 indicating the presence, un-docked state (e.g., decoupled from a pen well or charger), and/or proximity of active pen 113 to IHS 100 or touchpad 112 (within a selected threshold); and software monitor(s) 203 indicating execution of a collaboration application (e.g., annotation, whiteboarding, etc.) and/or a video conferencing service (e.g., ZOOM, MICROSOFT TEAMS, etc.).

As shown, the collaboration mode of method 300 includes a first set of operations 301, performed while touchpad 112 is in mouse mode 207, and a second set of pen mode operations 302 performed while touchpad 112 is in pen mode 206. To transition from operations 301 to 302, a user may issue a command at 303, for example, by activating button or switch 114 on active pen 113, by entering a keyboard keystroke or keystroke combination, by selecting a GUI option, by uttering a verbal command, etc. Conversely, to transition from operations 302 to 301, the user may issue another command at 304, for example, by again activating button or switch 114 on active pen 113 or using any of the aforementioned techniques. Additionally, or alternatively, transitions 303 and/or 304 between operations 301 and 302 may be context-based.

To start operations 301, collaboration touchpad service 201 may identify the execution of an application (e.g., in a foreground window) that is not pen-enabled (i.e., does not support WINDOWS INK or other digital writing environment) or a collaboration or video conferencing application at 305, for example, using software monitor(s) 203. At 306, collaboration touchpad service 201 may determine that active pen 113 is in communication with and/or sufficiently near IHS 100. At 307, collaboration touchpad service 201 may move a pointer or cursor rendered on display device 111 under control of active pen 113, as active pen 113 moves in contact with the surface of touchpad 112.

Particularly, at 308, collaboration touchpad service 201 obtains the relative position of active pen 113 on touchpad 112. Still at 308, collaboration touchpad service 201 may change the palm rejection settings of touchpad 112 for operation in mouse mode (e.g., less aggressive).

At 309, collaboration touchpad service 201 sends the relative position of active pen 113 as an input to IHS 100, which in turns associates that position with the current position of a pointer or cursor on display device 111, translates movements of active pen 113 from its relative position to movements of the pointer or cursor from its current position, and displays the pointer or cursor on display device 111. At 303, collaboration touchpad service 201 detects the push of pen button 114 and enters operations 302.

Additionally, or alternatively, operations 302 may be initiated in response to collaboration touchpad service 201 identifying the execution of an application that is pen-enabled or a collaboration or video conferencing application at 310, for example, using software monitor(s) 203. At 311, collaboration touchpad service 201 may determine that active pen 113 is sufficiently charged and in communication with and/or in sufficient proximity to IHS 100.

At 312, collaboration touchpad service 201 allows a user to employ active pen 113 to draw on display 111 by moving active pen 113 on the surface of touchpad 112. Particularly, at 313, collaboration touchpad service 201 obtains the absolute position of active pen 113 on touchpad 112. Also at 313, collaboration touchpad service 201 may change the palm rejection settings of touchpad 112 for operation in pen mode (e.g., more aggressive). Still at 313, touchpad 112 may detect a pressure exerted on touchpad 112 by the tip of active pen 113 (e.g., a spring and force sensor may be coupled to the tip of active pen 113), for example, to increase or decrease the darkness and/or width of lines shown on the display proportionally to the pressure, which is different from a human finger touching touchpad 112.

At 314, collaboration touchpad service 201 sends the absolute position of active pen 113 as an input to IHS 100, which in turns associates it with a corresponding absolute position of a pointer or cursor on display device 111, thus allowing the user to draw, whiteboard, sign and annotate documents, etc.

At 315, collaboration touchpad service 201 may determine that active pen 113 is hovering over touchpad 312. At 316, collaboration touchpad service 201 may get the absolute position of the hovering pen 113 on touchpad 112 and/or its distance from the surface of touchpad 112. Then, at 317, collaboration touchpad service 201 may initiate a zoom or magnification window and enable the user to move the window around display 111 during execution of a collaboration or video conferencing session based on the absolution position of hovering pen 113. Additionally, or alternatively, at 317, collaboration touchpad service 201 may increase or decrease the amount of magnification of the selected display area based upon or proportionally to a height of hovering pen 113.

In various embodiments, collaboration touchpad service 201 may start any of operations 301 and/or 302 of method 300 in response to one or more of: an identity of a selected collaboration or video conferencing application, the opening or closing of a collaboration or video conferencing application, the start and end times of a collaboration or video conferencing session, a role of the user of IHS 100 in the collaboration or video conferencing session (e.g., host, presenter, non-presenting participant, etc.), a location of the user of IHS during the collaboration or video conferencing session (e.g., onsite or remote), etc.

As such, systems and methods described herein may enable a user to operate a pen or stylus on a laptop touchpad set in a collaborative mode to, for example: write characters, write in cursive or handwriting, draw, quick launch applications, capture freeform screenshots, etc.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a processor; and
   a memory coupled to the processor, the memory having program instructions stored thereon that, upon execution by the processor, cause the IHS to:
      receive at least three different inputs comprising at least one input from a posture sensor, at least one input from a software monitor, and at least one input from a pen sensor;
      activate a collaboration mode of a touchpad in response to an indication from the posture sensor that the IHS is in a laptop posture as well as in response to the at least one input from the software monitor and the at least one input from the pen sensor, wherein the collaboration mode includes a first set of operations performed while the touchpad is in a mouse mode and a second set of operations performed while the touchpad is in a pen mode; and
      transition operation of the touchpad during the collaboration mode in response to the at least three different inputs comprising the at least one input received from the posture sensor, the at least one input received from the software monitor, and the at least one input received from the pen sensor.

2. The IHS of claim 1, wherein the at least one input from the software monitor comprises an indication of a collaboration application.

3. The IHS of claim 1, wherein the at least one input from the software monitor comprises at least one of: a time of a collaboration session, a location of a participant of the collaboration session, or a role of the participant of the collaboration session.

4. The IHS of claim 1, wherein the at least one input from the pen sensor comprises an indication that an active pen is present.

5. The IHS of claim 4, wherein the at least one input from the pen sensor comprises an indication of a distance or proximity of the active pen to the IHS or the touchpad.

6. The IHS of claim 1, wherein in the collaboration mode, the program instructions, upon execution, further cause the IHS to:
   determine a relative position of an active pen on the touchpad and render a pointer at a display position corresponding to the relative position in accordance with the mouse mode; and
   in response to a command, determine an absolute position of the active pen on the touchpad and enable one or more drawing tools using the absolute position in accordance with the pen mode.

7. The IHS of claim 6, wherein the command comprises a keyboard keystroke.

8. The IHS of claim 6, wherein the command comprises a pen button toggle.

9. The IHS of claim 6, wherein in the collaboration mode, the program instructions, upon execution, further cause the IHS to, in response to the command, change a palm rejection setting of the touchpad.

10. The IHS of claim 6, wherein the one or more drawing tools are part of a collaboration application monitored by the software monitor.

11. The IHS of claim 6, wherein the program instructions, upon execution, further cause the IHS to:
    determine that the active pen is hovering above a second absolute position of the touchpad; and
    initiate a zoom window at a display location corresponding to the second absolute position.

12. The IHS of claim 11, wherein the program instructions, upon execution, further cause the IHS to:
    detect a vertical distance between the active pen and the touchpad; and
    increase or reduce an amount of magnification of the zoom window proportionally to the vertical distance.

13. The IHS of claim 1, wherein the program instructions, upon execution, further cause the IHS to set the touchpad to the mouse mode in response to a changed input from at least one of: the posture sensor, the software monitor, or the pen sensor.

14. A method, comprising:
    receiving at least three different inputs comprising at least one input from a posture sensor, at least one input from a software monitor, and at least one input from a pen sensor;
    activating a collaboration mode of a touchpad in response to an indication from the posture sensor that an information handling system (IHS) is in a laptop posture as well as in response to the at least one input from the software monitor and the at least one input from the pen sensor, wherein the collaboration mode includes a first set of operations performed while the touchpad is in a mouse mode and a second set of operations performed while the touchpad is in a pen mode;
    transitioning operation of the touchpad during the collaboration mode in response to the at least three different inputs comprising the at least one input received from the posture sensor, the at least one input received from the software monitor, and the at least one input received from the pen sensor;
    operating a pointer on a display position corresponding to a relative position of a pen on the touchpad in accordance with the mouse mode; and
    in response to a command, operating a drawing tool on another display position corresponding to an absolute position of the pen on the touchpad in accordance with the pen mode.

15. The method of claim 14, further comprising:
    determining that the pen is hovering above the absolute position; and
    rendering a zoom window at a display location corresponding to the absolute position.

16. The method of claim 15, further comprising:
    detecting a vertical distance between the pen and the touchpad; and
    changing an amount of magnification in the zoom window proportionally to the vertical distance.

17. A non-transitory hardware memory device having program instructions stored thereon that, upon execution by a processor of an Information Handling System (IHS), cause the IHS to:

receive at least three different inputs comprising at least one input from a posture sensor, at least one input from a software monitor, and at least one input from a pen sensor;

activate a collaboration mode of a touchpad in response to an indication from the posture sensor that the IHS is in a laptop posture as well as in response to the at least one input from the software monitor and the at least one input from the pen sensor, wherein the collaboration mode includes a first set of operations performed while the touchpad is in a mouse mode and a second set of operations performed while the touchpad is in a pen mode;

transition operation of the touchpad during the collaboration mode in response to the at least three different inputs comprising the at least one input received from the posture sensor;

operate a pointer on a display position corresponding to a relative position of a pen on the touchpad in accordance with the mouse mode; and in response to a command, operate a drawing tool on another display position corresponding to an absolute position of the pen on the touchpad in accordance with the pen mode.

18. The non-transitory hardware memory device of claim 17, wherein the program instructions, upon execution, further cause the IHS to:

determine that the pen hovers above a different absolute position; and render a zoom window at a display location corresponding to the different absolute position.

19. The non-transitory hardware memory device of claim 18, wherein the program instructions, upon execution, further cause the IHS to:

detect a vertical distance between the pen and the touchpad; and change an amount of magnification in the zoom window proportionally to the vertical distance.

20. The non-transitory hardware memory device of claim 17, wherein the program instructions, upon execution, further cause the IHS to set the touchpad to the mouse mode in response to a changed input from at least one of: the posture sensor, the software monitor, or the pen sensor.

\* \* \* \* \*

UNITED STATES PATENT AND TRADEMARK OFFICE
CERTIFICATE OF CORRECTION

| | | |
|---|---|---|
| PATENT NO. | : 12,141,372 B2 | Page 1 of 1 |
| APPLICATION NO. | : 17/652155 | |
| DATED | : November 12, 2024 | |
| INVENTOR(S) | : Kai Wang, Daniel L. Hamlin and Vivek Viswanathan Iyer | |

It is certified that error appears in the above-identified patent and that said Letters Patent is hereby corrected as shown below:

In the Claims

In Column 13 Line 17 Claim 17, delete "the posture sensor;" and insert -- the posture sensor, the at least one input received from the software monitor, and the at least one input received from the pen sensor; -- therefor.

Signed and Sealed this
Seventeenth Day of December, 2024

Derrick Brent
*Acting Director of the United States Patent and Trademark Office*